United States Patent
Mellin et al.

(10) Patent No.: US 9,243,368 B2
(45) Date of Patent: Jan. 26, 2016

(54) EMBOSSED FIBROUS STRUCTURES AND METHODS FOR MAKING SAME

(75) Inventors: Andre Mellin, Amberley Village, OH (US); Jason Merrill Jones, Lebanon, OH (US); Thomas Timothy Byrne, West Chester, OH (US); Kevin Benson McNeil, Loveland, OH (US); John Allen Manifold, Milan, IN (US)

(73) Assignee: The Procter & Gamble Company, Cincinnati, OH (US)

(*) Notice: Subject to any disclaimer, the term of this patent is extended or adjusted under 35 U.S.C. 154(b) by 995 days.

(21) Appl. No.: 12/468,574

(22) Filed: May 19, 2009

(65) Prior Publication Data

US 2010/0297400 A1    Nov. 25, 2010

(51) Int. Cl.
*B32B 3/30* (2006.01)
*D21H 27/02* (2006.01)
*B32B 3/00* (2006.01)

(52) U.S. Cl.
CPC . *D21H 27/02* (2013.01); *B32B 3/00* (2013.01); *D21H 5/02* (2013.01); *Y10T 428/2457* (2015.01); *Y10T 428/24479* (2015.01)

(58) Field of Classification Search
CPC .............. D21H 5/02; D21H 27/02; B32B 3/30
USPC ......... 428/152, 153, 156, 172, 175, 179, 212; 162/190, 113
See application file for complete search history.

(56) References Cited

U.S. PATENT DOCUMENTS

| | | |
|---|---|---|
| 2,870,737 A | 1/1959 | Byrnes |
| 3,414,459 A | 12/1968 | Wells |
| 3,478,141 A | 11/1969 | Dempsey et al. |
| 3,556,907 A | 1/1971 | Nystrand |
| 3,661,680 A | 5/1972 | Gore |
| 3,672,949 A | 6/1972 | Brown |
| 3,672,950 A | 6/1972 | Murphy et al. |
| 3,953,638 A * | 4/1976 | Kemp ........................ 428/154 |
| 3,961,119 A | 6/1976 | Thomas |
| 4,158,594 A | 6/1979 | Becker et al. |
| 4,469,735 A * | 9/1984 | Trokhan ..................... 428/154 |
| 4,483,728 A | 11/1984 | Bauernfeind |
| 4,487,796 A | 12/1984 | Lloyd et al. |
| 4,502,912 A | 3/1985 | Steiner et al. |
| 4,601,938 A * | 7/1986 | Deacon et al. ............. 428/153 |
| 4,671,983 A * | 6/1987 | Burt .......................... 428/179 |
| 4,803,032 A | 2/1989 | Schulz |
| 5,143,776 A | 9/1992 | Givens |
| 5,173,351 A | 12/1992 | Ruppel et al. |
| 5,269,983 A | 12/1993 | Schulz |

(Continued)

FOREIGN PATENT DOCUMENTS

| EP | 0 096 832 A2 | 12/1983 |
|---|---|---|
| EP | 338792 B1 | 3/1994 |

(Continued)

OTHER PUBLICATIONS

International Search Report Mailed Sep. 29, 2010.

(Continued)

*Primary Examiner* — Donald J Loney
(74) *Attorney, Agent, or Firm* — Roddy M. Bullock

(57) ABSTRACT

Embossed fibrous structures having one or more line element embossments and one or more linear elements and to methods for making same are provided.

16 Claims, 7 Drawing Sheets

(56) References Cited

U.S. PATENT DOCUMENTS

| | | | |
|---|---|---|---|
| 5,332,472 A | 7/1994 | Cutright et al. | |
| 5,356,364 A | 10/1994 | Veith et al. | |
| 5,431,786 A | 7/1995 | Rasch et al. | |
| 5,496,603 A * | 3/1996 | Riedel et al. | 428/41.5 |
| 5,503,896 A | 4/1996 | Veith et al. | |
| 5,686,168 A | 11/1997 | Laurent et al. | |
| 5,693,403 A | 12/1997 | Brown et al. | |
| 5,702,571 A | 12/1997 | Kamps et al. | |
| 5,743,999 A | 4/1998 | Kamps et al. | |
| 5,773,081 A | 6/1998 | Williamitis et al. | |
| 5,874,156 A | 2/1999 | Schulz | |
| 6,039,839 A | 3/2000 | Trokhan | |
| 6,086,715 A | 7/2000 | Mcneil | |
| 6,106,928 A | 8/2000 | Laurent et al. | |
| 6,235,373 B1 | 5/2001 | Graff | |
| 6,348,131 B1 * | 2/2002 | Kershaw et al. | 162/112 |
| 6,589,634 B2 | 7/2003 | Schultz et al. | |
| 6,602,577 B1 | 8/2003 | Ostendorf et al. | |
| 6,647,883 B1 | 11/2003 | McNeil | |
| 6,715,411 B1 | 4/2004 | Boegli | |
| 6,739,024 B1 | 5/2004 | Wagner | |
| 6,746,570 B2 * | 6/2004 | Burazin et al. | 162/109 |
| 6,802,937 B2 | 10/2004 | Johnston et al. | |
| 6,821,385 B2 * | 11/2004 | Burazin et al. | 162/109 |
| 6,846,172 B2 | 1/2005 | Vaughn et al. | |
| 7,235,156 B2 * | 6/2007 | Baggot | 162/117 |
| 7,285,317 B2 | 10/2007 | Biagiotti et al. | |
| D554,867 S | 11/2007 | Bianchi | |
| 7,314,663 B2 | 1/2008 | Stelljes, Jr. et al. | |
| 7,314,664 B2 | 1/2008 | Stelljes, Jr. et al. | |
| 7,314,665 B2 | 1/2008 | Stelljes, Jr. et al. | |
| 7,494,564 B2 | 2/2009 | Basler et al. | |
| D612,616 S | 3/2010 | Sanders et al. | |
| D618,462 S | 6/2010 | Fung et al. | |
| D618,918 S | 7/2010 | Hutchison et al. | |
| D624,756 S | 10/2010 | Walther et al. | |
| 2003/0031919 A1 | 2/2003 | Isozaki et al. | |
| 2003/0116291 A1 | 6/2003 | Zoeller et al. | |
| 2003/0175441 A1 | 9/2003 | Bernards | |
| 2004/0062916 A1 | 4/2004 | Mansson et al. | |
| 2004/0084167 A1 | 5/2004 | Vinson et al. | |
| 2004/0121133 A1 | 6/2004 | Anderson et al. | |
| 2004/0231813 A1 | 11/2004 | Basler et al. | |
| 2005/0006816 A1 | 1/2005 | Drut et al. | |
| 2005/0069679 A1 | 3/2005 | Steljes et al. | |
| 2005/0138981 A1 | 6/2005 | Wilhelm | |
| 2005/0153100 A1 | 7/2005 | Zoller | |
| 2006/0088697 A1 | 4/2006 | Manifold et al. | |
| 2006/0137840 A1 * | 6/2006 | Burazin et al. | 162/109 |
| 2006/0193985 A1 | 8/2006 | McNeil et al. | |
| 2007/0056704 A1 | 3/2007 | Wilke | |
| 2007/0272381 A1 | 11/2007 | Elony et al. | |
| 2010/0028621 A1 | 2/2010 | Byrne et al. | |
| 2010/0030174 A1 | 2/2010 | Buschur et al. | |

FOREIGN PATENT DOCUMENTS

| | | |
|---|---|---|
| EP | 1 099 539 A1 | 5/2001 |
| EP | 1 203 619 A2 | 5/2002 |
| EP | 796727 B1 | 9/2002 |
| EP | 1 140 482 B1 | 2/2005 |
| EP | 1 876 291 A2 | 1/2008 |
| WO | WO 94/03677 A1 | 2/1994 |
| WO | WO 96/00814 A1 | 1/1996 |
| WO | WO 96/18771 A1 | 6/1996 |
| WO | WO 97/20107 A1 | 6/1997 |
| WO | WO 98/47697 A1 | 10/1998 |
| WO | WO 98/47706 A1 | 10/1998 |
| WO | WO 00/31341 A1 | 6/2000 |
| WO | WO 00/38565 A1 | 7/2000 |
| WO | WO 00/73053 A1 | 12/2000 |
| WO | WO 02/40769 A2 | 5/2002 |
| WO | WO 03/072344 A1 | 9/2003 |
| WO | WO 2005/042273 A2 | 5/2005 |
| WO | WO 2006/092818 A1 | 9/2006 |
| WO | WO 2009/107021 A1 | 9/2009 |
| WO | WO 2010/017189 A1 | 2/2010 |

OTHER PUBLICATIONS

U.S. Appl. No. 12/468,523, filed May 19, 2009, Mellin, et al.
U.S. Appl. No. 12/468,557, filed May 19, 2009, Mellin, et al.
U.S. Appl. No. 12/468,394, filed May 19, 2009, McNeil, et al.
U.S. Appl. No. 29/337,324, filed May 19, 2009, Colella, et al.
U.S. Appl. No. 14/268,182, filed May 2, 2014, McNeil, et al.
U.S. Appl. No. 14/268,211, filed May 2, 2014, McNeil, et al.
U.S. Appl. No. 13/433,538, filed Mar. 29, 2012, McNeil.
U.S. Appl. No. 12/468,557 Office Action mailed Aug. 3, 2011, May 19, 2009.
All Office Actions in U.S. Appl. No. 12/468,574, U.S. Appl. No. 12/468,557, and U.S. Appl. No. 12/468,394, U.S. Appl. No. 12/468,523, all dated May 19, 2009.
All Office Actions in U.S. Appl. No. 12/468,523, U.S. Appl. No. 12/468,574, U.S. Appl. No. 12/468,557, and U.S. Appl. No. 12/468,394 all dated May 19, 2009.

* cited by examiner

EMBOSSED FIBROUS STRUCTURES AND METHODS FOR MAKING SAME

FIELD OF THE INVENTION

The present invention relates to embossed fibrous structures and more particularly to embossed fibrous structures comprising one or more linear elements and one or more line element embossments and to methods for making same.

BACKGROUND OF THE INVENTION

Fibrous structures with line element embossments are known. However, the clarity of the line element embossments have been problematic and have resulted in consumer negatives.

Accordingly, there is a need for a fibrous structure that comprises one or more line element embossments wherein the clarity of the line element embossment is superior to known fibrous structures comprising line element embossments and for methods for making same.

SUMMARY OF THE INVENTION

The present invention fulfills the need described above by providing a fibrous structure that comprises one or more linear elements and one or more line element embossments. It has been surprisingly found that incorporating one or more linear elements into a fibrous structure comprising one or more line element embossments increases the clarity of the line element embossments compared to fibrous structures comprising the line element embossments without the linear elements.

In one example of the present invention, a fibrous structure that comprises one or more linear elements and one or more line element embossments, is provided.

In another example of the present invention, a fibrous structure comprising a plurality of linear elements and one or more line element embossments, wherein at least one of the line element embossments exhibits a line element width such that at any given line element width the line element embossment overlaps one or more linear elements, is provided.

In even another example of the present invention, a single- or multi-ply sanitary tissue product comprising a fibrous structure according to the present invention, is provided.

In still another example, a method for making a fibrous structure, the method comprising the steps of:
a. providing a fibrous structure comprising a plurality of linear elements; and
b. embossing the fibrous structure with a line element embossment having a line element width;
wherein the plurality of linear elements are arranged such that the line element width results in the line element embossment along its length overlapping one or more linear elements at a time, is provided.

In even yet another example of the present invention, a method for making a fibrous structure, the method comprising the steps of:
a. providing a fibrous structure comprising a plurality of linear elements having a linear element width; and
b. embossing the fibrous structure with one or more line element embossments at least one of the line element embossments having a line element width wherein the ratio of the linear element width to the line element width is 1:1.5 or less, is provided.

Accordingly, the present invention provides a fibrous structure that comprises one or more linear elements and one or more line element embossments and methods for making same.

DETAILED DESCRIPTION OF THE INVENTION

Definitions

Figure 1:
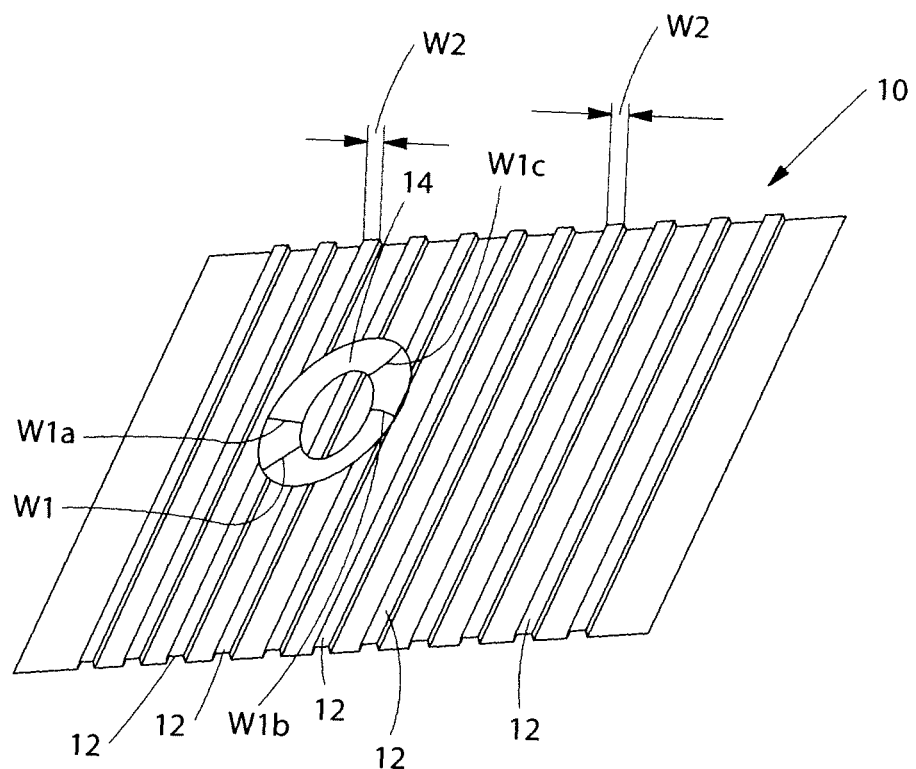
FIG. 1 is a schematic representation of an embossed fibrous structure according to the present invention.

"Fibrous structure" as used herein means a structure that comprises one or more filaments and/or fibers. In one example, a fibrous structure according to the present invention means an orderly arrangement of filaments and/or fibers within a structure in order to perform a function. Non-limiting examples of fibrous structures of the present invention include paper, fabrics (including woven, knitted, and non-woven), and absorbent pads (for example for diapers or feminine hygiene products).

Non-limiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structures of the present invention may be homogeneous or may be layered. If layered, the fibrous structures may comprise at least two and/or at least three and/or at least four and/or at least five layers.

The fibrous structures of the present invention may be co-formed fibrous structures.

"Fiber" and/or "Filament" as used herein means an elongate particulate having an apparent length greatly exceeding its apparent width, i.e. a length to diameter ratio of at least about 10. In one example, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include wood pulp fibers and synthetic staple fibers such as polyester fibers.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

In one example, the sanitary tissue product of the present invention comprises a fibrous structure according to the present invention.

The sanitary tissue products and/or fibrous structures of the present invention may exhibit a basis weight of greater than 15 g/m$^2$ (9.2 lbs/3000 ft$^2$) to about 120 g/m$^2$ (73.8 lbs/3000 ft$^2$ and/or from about 15 g/m$^2$ (9.2 lbs/3000 ft$^2$) to about 110 g/m$^2$ (67.7 lbs/3000 ft$^2$ and/or from about 20 g/m$^2$ (12.3 lbs/3000 ft$^2$) to about 100 g/m$^2$ (61.5 lbs/3000 ft$^2$) and/or from about 30 (18.5 lbs/3000 ft$^2$) to 90 g/m$^2$ (55.4 lbs/3000 ft$^2$). In addition, the sanitary tissue products and/or fibrous structures of the present invention may exhibit a basis weight between about 40 g/m$^2$ (24.6 lbs/3000 ft$^2$) to about 120 g/m$^2$ (73.8 lbs/3000 ft$^2$) and/or from about 50 g/m$^2$ (30.8 lbs/3000 ft$^2$) to about 110 g/m$^2$ (67.7 lbs/3000 ft$^2$) and/or from about 55 g/m$^2$ (33.8 lbs./3000 ft$^2$) to about 105 g/m$^2$ (64.6 lbs/3000 ft$^2$) and/or from about 60 (36.9 lbs/3000 ft$^2$) to 100 g/m$^2$ (61.5 lbs/3000 ft$^2$).

The sanitary tissue products of the present invention may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the sanitary tissue product of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the sanitary tissue product exhibits a total dry tensile strength of less than about 394 g/cm (1000 g/in) and/or less than about 335 g/cm (850 g/in).

In another example, the sanitary tissue products of the present invention may exhibit a total dry tensile strength of greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The sanitary tissue products of the present invention may exhibit an initial total wet tensile strength of less than about 78 g/cm (200 g/in) and/or less than about 59 g/cm (150 g/in) and/or less than about 39 g/cm (100 g/in) and/or less than about 29 g/cm (75 g/in).

The sanitary tissue products of the present invention may exhibit an initial total wet tensile strength of greater than about 118 g/cm (300 g/in) and/or greater than about 157 g/cm (400 g/in) and/or greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 118 g/cm (300 g/in) to about 1968 g/cm (5000 g/in) and/or from about 157 g/cm (400 g/in) to about 1181 g/cm (3000 g/in) and/or from about 196 g/cm (500 g/in) to about 984 g/cm (2500 g/in) and/or from about 196 g/cm (500 g/in) to about 787 g/cm (2000 g/in) and/or from about 196 g/cm (500 g/in) to about 591 g/cm (1500 g/in).

The sanitary tissue products of the present invention may exhibit a density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm³ to about 0.20 g/cm³ and/or from about 0.02 g/cm³ to about 0.10 g/cm³.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, such as quaternary ammonium softening agents, temporary wet strength agents, permanent wet strength agents, bulk softening agents, lotions, silicones, wetting agents, latexes, especially surface-pattern-applied latexes, dry strength agents such as carboxymethylcellulose and starch, and other types of additives suitable for inclusion in and/or on sanitary tissue products.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 ft² or g/m² and is measured according to the Basis Weight Test Method described herein.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Line element embossment" as used herein means an embossment that comprises a continuous line that has an aspect ratio of greater than 1.5:1 and/or greater than 1.75:1 and/or greater than 2:1 and/or greater than 5:1. In one example, the line element embossment exhibits a length of at least 2 mm and/or at least 4 mm and/or at least 6 mm and/or at least 1 cm to about 10.16 cm and/or to about 8 cm and/or to about 6 cm and/or to about 4 cm.

"Linear element" as used herein refers to an intentional deformation of the surface plane's first elevation to create a second elevation, wherein the deformation forms a ridge line between two points having a substantially uninterrupted and constant second elevation. The linear element ridge has a direction as determined by its length, a width and a length by width aspect ratio of greater than 1.1:1 and/or greater than 1.75:1 and/or greater than 2:1 and/or greater than 5:1.

The linear element is further defined wherein the second elevation formed by the ridge has a surface roughness, a radius of curvature along the edges of the ridge and a radius of curvature across the ridge surface.

The surface roughness of the ridge's second elevation is defined as the low-level variation in elevation along the linear element ridge surface. The surface roughness of the ridge's second elevation is preferably from about 9 microns to about 60 microns. More preferably the surface roughness of the ridge's second elevation is from about 10 microns to about 40 microns. Most preferably the surface roughness of the ridge's second elevation is from about 15 microns to about 30 microns.

The radius of curvature along the edges of the linear element ridge can be from about 120 microns to about 500 microns. More preferably the radius of curvature along the edges of the linear element ridge is about 220 microns to about 280 microns. Most preferably the radius of curvature along the edges of the linear element ridge is from about 230 microns to about 280 microns.

The radius of curvature across the width of the linear element ridge surface can be greater than about 0.1 mm.

The surface roughness and radius of curvature is determined by the Roughness and Radius of Curvature Test Method described herein.

In one example, the linear element and/or linear element forming component is continuous or substantially continuous with a useable fibrous structure, for example in one case one or more 11 cm×11 cm sheets of fibrous structure.

"Discrete" as it refers to a linear element means that a linear element has at least one immediate adjacent region of the fibrous structure that is different from the linear element.

"Unidirectional" as it refers to a linear element means that along the length of the linear element, the linear element does not exhibit a directional vector that contradicts the linear element's major directional vector.

"Uninterrupted" as it refers to a linear element means that a linear element does not have a region that is different from the linear element cutting across the linear element along its length. Undulations within a linear element such as those resulting from operations such creping and/or foreshortening are not considered to result in regions that are different from the linear element and thus do not interrupt the linear element along its length.

"Water-resistant" as it refers to a linear element means that a linear element retains its structure and/or integrity after being saturated.

"Substantially machine direction oriented" as it refers to a linear element means that the total length of the linear element that is positioned at an angle of greater than 45° to the cross machine direction is greater than the total length of the linear element that is positioned at an angle of 45° or less to the cross machine direction.

"Substantially cross machine direction oriented" as it refers to a linear element means that the total length of the linear element that is positioned at an angle of 45° or greater to the machine direction is greater than the total length of the linear element that is positioned at an angle of less than 45° to the machine direction.

Fibrous Structure

As shown in FIG. 1, the fibrous structure 10 of the present invention comprises a plurality of linear elements 12 and a line element embossment 14. The fibrous structure 10 may comprise a plurality of line element embossments 14, some or all of which may be associated with one another to form an embossment design, such as a representation of a flower.

The line element embossment may exhibit a maximum line element width along the length of the line element embossment of greater than about 1.0 mm and/or from about 1.0 to about 5.0 mm and/or from about 1.2 to about 4.0 mm and/or from about 1.5 mm to about 3.5 mm.

The linear elements 12 may exhibit a maximum linear element width of greater than about 0.30 mm and/or from about 0.35 to about 3.0 mm and/or from about 0.50 to about 1.5 mm and/or from about 0.55 to about 1.0 mm. Two or more linear elements may exhibit the same or different maximum linear element widths.

In addition to the line element embossments and the linear elements, the embossed fibrous structures may also comprise a background texture that completely or partially surrounds one or more line element embossments. The background texture may be imparted to the embossed fibrous structure by the embossing rolls that impart the line element embossments.

In one example, the fibrous structure of the present invention comprises a plurality of linear elements and one or more line element embossments, wherein at least one line element embossment exhibits a line element width such that at any given line element width along the length of the line element embossment, the line element embossment overlaps no more than one linear element or portion thereof. In one example, the line element embossment 14 at a given width W1$a$ may completely overlap the width W2 of the linear element 12. In another example, the line element embossment 14 at a given width W1$b$ may partially overlap the width W2 of the linear element 12. In still another example, the line element embossment 14 at a given width W1$c$ may not overlap any portion of a linear element 12.

In one example, the fibrous structure of the present invention comprises a plurality of linear elements and one or more line element embossments, wherein at least one of the line element embossments exhibits a line element width such that at any given line element width along the length of the line element embossment, the line element embossment overlaps two or more linear elements or respective portions thereof.

In one example of the present invention, the maximum line element width along the line element embossment is greater than the maximum linear element width along the length of the linear element.

In one example, a fibrous structure 10 of the present invention comprises at least one linear element 12 having a maximum linear element width W2 and a line element embossment 14 having a maximum line element width W1, such that the ratio of the maximum linear element width W2 to the maximum line element width W1 is 1:1.5 or less and/or 1:2 or less and/or 1:3 or less and/or 1:4 or less.

In another example, a fibrous structure of the present invention may comprise a line element embossment having a line element width that is greater then the linear element width, but less than the average linear element spacing.

Figure 2:
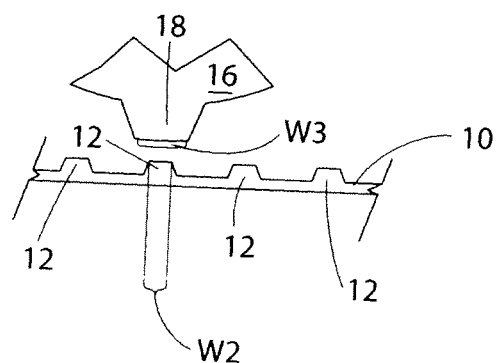
FIG. 2 is an enlarged partial schematic representation of a portion of a method for making the embossed fibrous structure of FIG. 1.

As shown in FIG. 2, an example of a process for imparting a line element embossment into a fibrous structure 10 comprises contacting a fibrous structure 10 comprising a plurality of linear elements 12 at least one of which exhibits a linear element width W2 with an embossing roll 16 comprising a line element embossment protrusion 18 having a line element embossment protrusion width W3 that imparts a line element embossment to the fibrous structure 10 during operation. The linear element width W2 is less than the line element embossment protrusion width W3. In one example, the line element embossment protrusion 18 may exhibit a maximum line element embossment protrusion width W3 along the length of the line element embossment protrusion 18 of greater than about 1.0 mm and/or from about 1.0 to about 5.0 mm and/or from about 1.2 to about 4.0 mm and/or from about 1.5 mm to about 3.5 mm.

In one example, at least one linear element 12 has a maximum linear element width W2 and the line element embossment protrusion 18 has a maximum line element embossment protrusion width W3, such that the ratio of the maximum linear element width W2 to the maximum line element embossment protrusion width W3 is 1:1.5 or less and/or 1:2 or less and/or 1:3 or less and/or 1:4 or less.

In another example, one or more of the line element embossments in the fibrous structure of the present invention may exhibit an embossment height of greater than about 200 µm and/or greater than about 400 µm and/or greater than about 500 µm and/or greater than about 600 µm and/or greater than about 1000 µm and/or from about 200 µm to about 2500 µm and/or from about 250 µm to about 2000 µm and/or from about 300 µm to about 1500 µm and/or from about 400 µm to about 1500 µm as measured by the Embossment Height Test Method described herein. In one example, at least one of the embossments in the fibrous structure exhibits an embossment height of from about 250 µm to about 500 µm.

The fibrous structure of the present invention may exhibit a flexural rigidity of less than about 10 cm and/or less than about 8 cm and/or less than about 6 cm and/or to about 1 cm and/or to about 3 cm as measured according to the Flexural Rigidity Test Method described herein.

In one example, the fibrous structure of the present invention may comprise a softening agent. In another example, the fibrous structure of the present invention may comprise a temporary wet strength agent and/or a permanent wet strength agent. Other suitable additives known to those skilled in the art may also be included in and/or on the fibrous structure of the present invention.

One or more of the embossed fibrous structures of the present invention may be utilized as a single-ply or multi-ply sanitary tissue product. In one example, one or more the embossed fibrous structures of the present invention are combined with one or more other fibrous structures, the same or different, to form a multi-ply fibrous structure. The multi-ply fibrous structure may be utilized as a multi-ply sanitary tissue product.

Line Element Embossments

Figure 3:
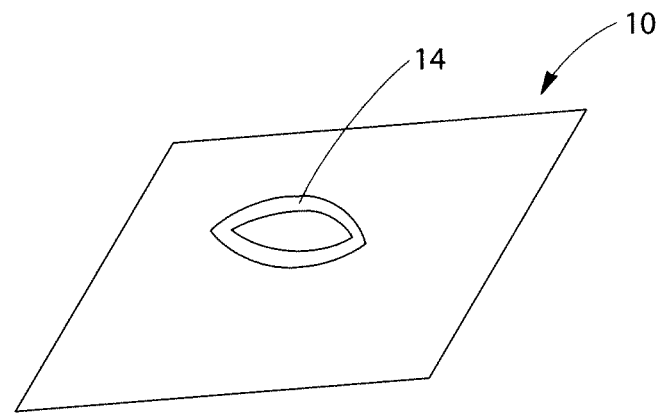
FIG. 3 is a schematic representation of an enclosed line element embossment on an embossed fibrous structure.
Figure 4:
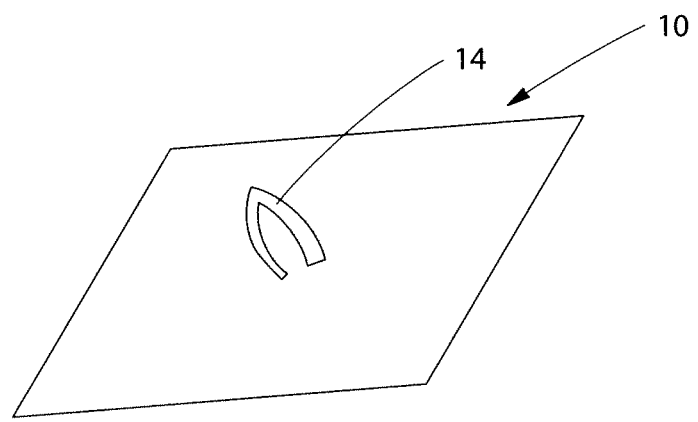
FIG. 4 is a schematic representation of a partially enclosed line element embossment on an embossed fibrous structure.

The line element embossments may be formed by any suitable means known in the art. The line element embossments may be fully enclosed, as shown in FIG. 3, or may be partially enclosed, as shown in FIG. 4. In addition, the line element embossment may be a curvilinear element that is open. It has been found that the fibrous structures of the present invention that comprise fully enclosed line element embossments and/or partially enclosed line element embossments exhibit puffiness and/or bulging of the fibrous structure bordered by the line element embossment. The line element embossment may comprise a plurality of individual line element embossments that are arranged together to form a line element embossment design, such as a representation of a flower.

In one example, at least one line element embossment is made by an embossing operation that utilizes one or more patterned rolls that impart to a fibrous structure at least one line element embossment. In one example, the patterned rolls impart at least one plurality of embossments. The patterned rolls may comprise discrete dot embossing and/or line element embossments. In one example, the fibrous structure of the present invention comprises a line element embossment at least partially surrounded, such as on at least two sides of the line element embossment, by a line of a plurality of dot embossments. The dot embossments in the fibrous structure of the present invention may be any desired shape, for example circles, ellipses, squares, triangles. The line element embossments may be of any width, length, or radius of curvature.

In another example, at least one line element embossment is made by contacting a molding member comprising a line element embossment forming element with a fibrous structure such that the line element embossment is imparted to the fibrous structure. The molding member may be a belt that comprises a line element embossment forming element.

In another example, the step of imparting a design element to a fibrous structure comprises passing a fibrous structure through an embossing nip formed by at least one embossing roll comprising a design element such that the design element is imparted to the fibrous structure.

In one example, the line element width is at least 0.30 mm and/or at least 0.75 mm.

Linear Elements

The linear elements of the present invention may be formed by any suitable means known in the art. In one example, the linear elements are formed by depositing a fibrous slurry onto a patterned belt that comprises linear element producing elements.

The linear elements may be of any length. The linear elements may be continuous relative to the fibrous structure upon which they are present. The linear elements may be discontinuous relative to the fibrous structure upon which they are present.

One or more of the linear elements may be oriented in substantially the machine direction on the fibrous structure. In another example, one or more of the linear elements may be oriented in substantially the cross-machine direction on the fibrous structure. In yet another example, one or more of the linear elements may be oriented in substantially the machine direction and one or more may be oriented in substantially the cross-machined direction on the fibrous structure.

In another example, at least one of the linear elements is imparted to the fibrous structure during the fibrous structure making process.

In even another example, at least one of the linear elements is imparted to the fibrous structure by an embossing process.

In one example, the plurality of linear elements are spaced apart from one another at a distance of at least 0.30 mm. In another example, the plurality of linear elements are spaced apart from one another at a distance of less than 3.0 mm.

Methods for Making Fibrous Structures

The fibrous structures of the present invention may be made by any suitable process known in the art. The method may be a fibrous structure making process that uses a cylindrical dryer such as a Yankee (a Yankee-process) or it may be a Yankeeless process as is used to make substantially uniform density and/or uncreped fibrous structures.

The linear elements present on a surface of the fibrous structure may be made by any suitable process. For example, the linear elements may be formed in the fibrous structure by using a molding member that comprise linear element imparting members FIG. 5 is a simplified, schematic representation of one example of a continuous fibrous structure making process and machine useful in the practice of the present invention.

Figure 5:
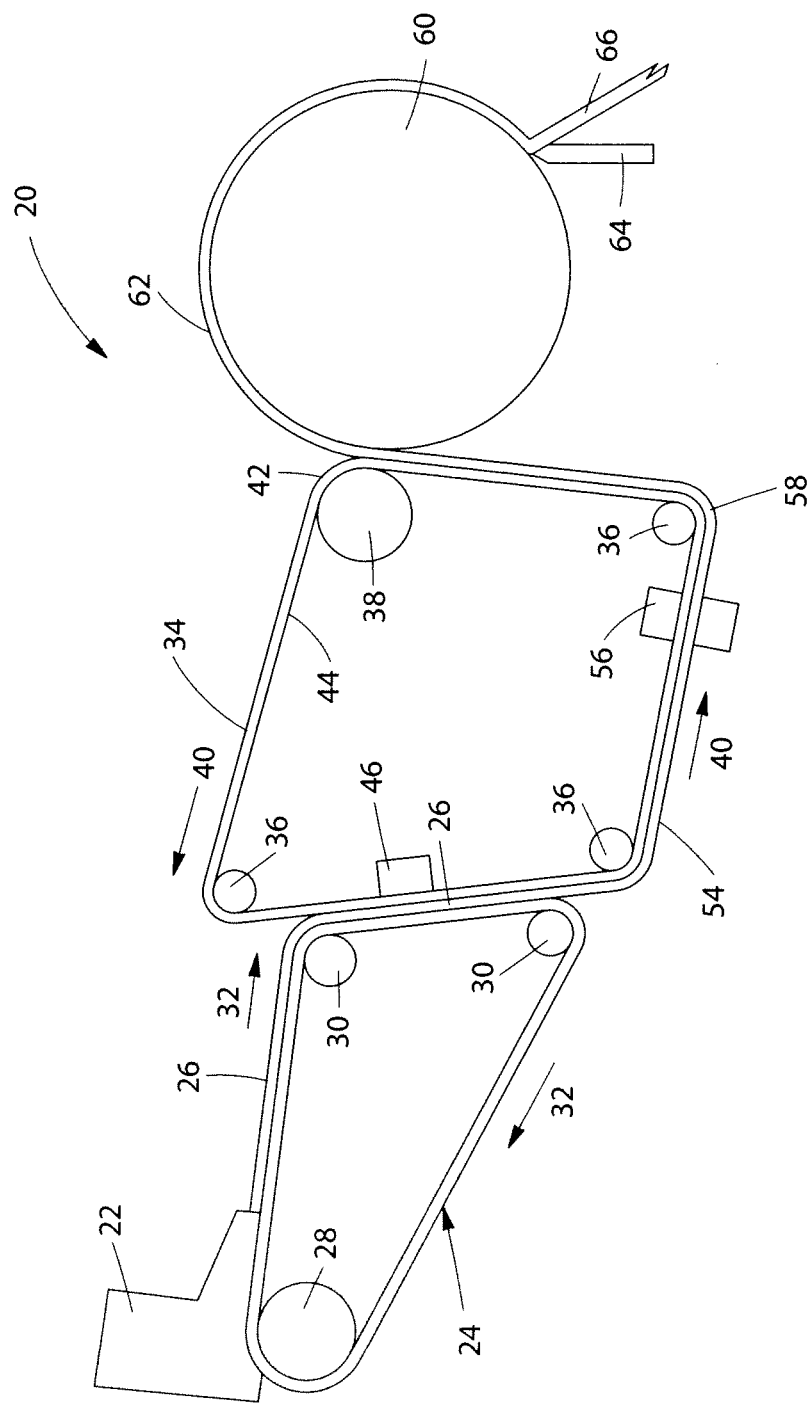
FIG. 5 is a schematic representation of an example of a method for making an embossed fibrous structure according to the present invention.

As shown in FIG. 5, one example of a process and equipment, represented as 20 for making a fibrous structure according to the present invention comprises supplying an aqueous dispersion of fibers (a fibrous furnish) to a headbox 22 which can be of any convenient design. From headbox 22 the aqueous dispersion of fibers is delivered to a first foraminous member 24 which is typically a Fourdrinier wire, to produce an embryonic fibrous web 26.

The first foraminous member 24 may be supported by a breast roll 28 and a plurality of return rolls 30 of which only two are shown. The first foraminous member 24 can be propelled in the direction indicated by directional arrow 32 by a drive means, not shown. Optional auxiliary units and/or devices commonly associated fibrous structure making machines and with the first foraminous member 24, but not shown, include forming boards, hydrofoils, vacuum boxes, tension rolls, support rolls, wire cleaning showers, and the like.

After the aqueous dispersion of fibers is deposited onto the first foraminous member 24, embryonic fibrous web 26 is formed, typically by the removal of a portion of the aqueous dispersing medium by techniques well known to those skilled in the art. Vacuum boxes, forming boards, hydrofoils, and the like are useful in effecting water removal. The embryonic fibrous web 26 travels with the first foraminous member 24 about return roll 30 and is brought into contact with a deflection member 34, which may also be referred to as a second foraminous member. While in contact with the deflection member 34, the embryonic fibrous web 26 will be deflected, rearranged, and/or further dewatered.

The deflection member 34 may be in the form of an endless belt. In this simplified representation, deflection member 34 passes around and about deflection member return rolls 36 and impression nip roll 38 and may travel in the direction indicated by directional arrow 40. Associated with deflection member 34, but not shown, may be various support rolls, other return rolls, cleaning means, drive means, and the like well known to those skilled in the art that may be commonly used in fibrous structure making machines.

Regardless of the physical form which the deflection member 34 takes, whether it is an endless belt as just discussed or some other embodiment such as a stationary plate for use in making handsheets or a rotating drum for use with other types of continuous processes, it must have certain physical characteristics. For example, the deflection member may take a variety of configurations such as belts, drums, flat plates, and the like.

First, the deflection member 34 may be foraminous. That is to say, it may possess continuous passages connecting its first surface 42 (or "upper surface" or "working surface"; i.e. the surface with which the embryonic fibrous web is associated, sometimes referred to as the "embryonic fibrous web-contacting surface") with its second surface 44 (or "lower surface"; i.e., the surface with which the deflection member return rolls are associated). In other words, the deflection member 34 may be constructed in such a manner that when water is caused to be removed from the embryonic fibrous web 26, as by the application of differential fluid pressure, such as by a vacuum box 46, and when the water is removed from the embryonic fibrous web 26 in the direction of the deflection member 34, the water can be discharged from the system without having to again contact the embryonic fibrous web 26 in either the liquid or the vapor state.

Figure 6:
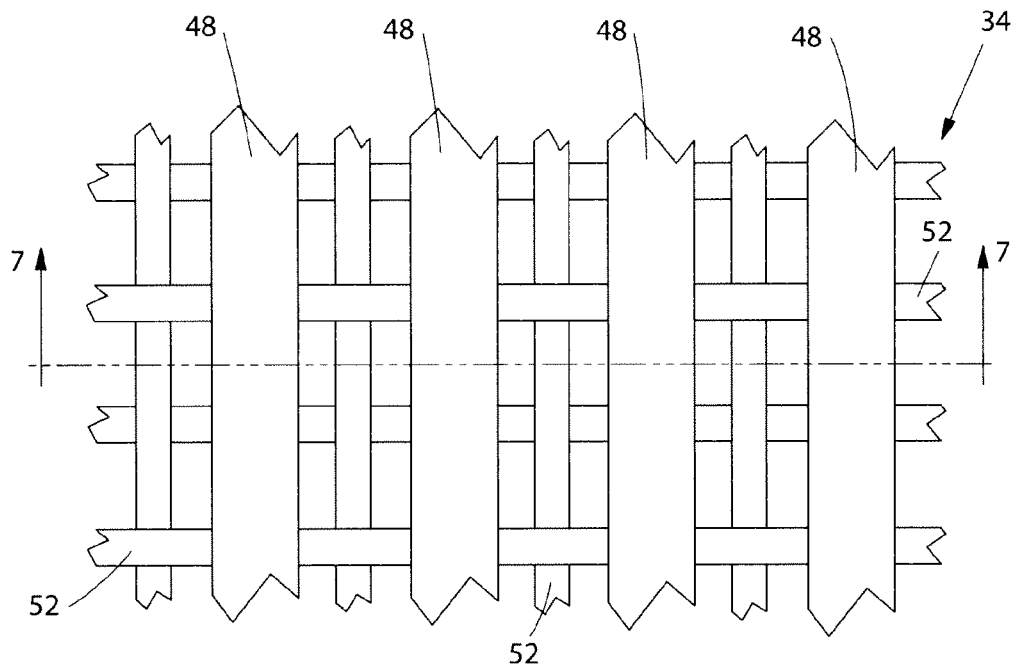
FIG. 6 is a schematic representation a portion of an example of a molding member in according with the present invention.
Figure 7:
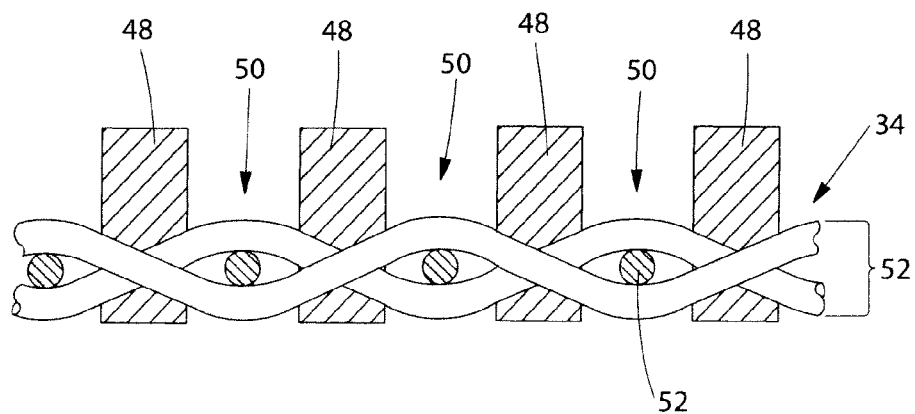
FIG. 7 is a cross-section view of FIG. 6 taken along line 7-7.

Second, the first surface 42 of the deflection member 34 may comprise one or more ridges 48 as represented in one example in FIGS. 6 and 7. The ridges 48 may be made by any suitable material. For example, a resin may be used to create the ridges 48. The ridges 48 may be continuous, or essentially continuous. In one example, the ridges 48 exhibit a length of greater than about 30 mm. The ridges 48 may be arranged to produce the linear element-containing fibrous structures of the present invention when utilized in a suitable fibrous structure making process. The ridges 48 may be patterned. The ridges 48 may be present on the deflection member 34 at any suitable frequency to produce the fibrous structures of the present invention. The ridges 48 may define within the deflection member 34 a plurality of deflection conduits 50. The deflection conduits 50 may be discrete, isolated, deflection conduits.

The deflection conduits 50 of the deflection member 34 may be of any size and shape or configuration so long at least one produces a linear element in the fibrous structure produced thereby. The deflection conduits 50 may repeat in a random pattern or in a uniform pattern. Portions of the deflection member 34 may comprise deflection conduits 50 that repeat in a random pattern and other portions of the deflection member 34 may comprise deflection conduits 50 that repeat in a uniform pattern.

The ridges 48 of the deflection member 34 may be associated with a belt, wire or other type of substrate. As shown in FIGS. 6 and 7, the ridges 48 of the deflection member 34 is associated with a woven belt 52. The woven belt 52 may be made by any suitable material, for example polyester, known to those skilled in the art.

As shown in FIG. 7, a cross sectional view of a portion of the deflection member 34 taken along line 7-7 of FIG. 6, the deflection member 34 can be foraminous since the deflection conduits 50 extend completely through the deflection member 34.

As shown in FIG. 5, after the embryonic fibrous web 26 has been associated with the deflection member 34, fibers within the embryonic fibrous web 26 are deflected into the deflection conduits present in the deflection member 34. In one example of this process step, there is essentially no water removal from the embryonic fibrous web 26 through the deflection conduits after the embryonic fibrous web 26 has been associated with the deflection member 34 but prior to the deflecting of the fibers into the deflection conduits. Further water removal from the embryonic fibrous web 26 can occur during and/or after the time the fibers are being deflected into the deflection conduits. Water removal from the embryonic fibrous web 56 may continue until the consistency of the embryonic fibrous web 26 associated with deflection member 34 is increased to from about 25% to about 35%. Once this consistency of the embryonic fibrous web 26 is achieved, then the embryonic fibrous web 26 is referred to as an intermediate fibrous web 54. During the process of forming the embryonic fibrous web 26, sufficient water may be removed, such as by a noncompressive process, from the embryonic fibrous web 26 before it becomes associated with the deflection member 34 so that the consistency of the embryonic fibrous web 26 may be from about 10% to about 30%.

While applicants decline to be bound by any particular theory of operation, it appears that the deflection of the fibers in the embryonic web and water removal from the embryonic web begin essentially simultaneously. Embodiments can, however, be envisioned wherein deflection and water removal are sequential operations. Under the influence of the applied differential fluid pressure, for example, the fibers may be deflected into the deflection conduit with an attendant rearrangement of the fibers. Water removal may occur with a continued rearrangement of fibers. Deflection of the fibers, and of the embryonic fibrous web, may cause an apparent increase in surface area of the embryonic fibrous web. Further, the rearrangement of fibers may appear to cause a rearrangement in the spaces or capillaries existing between and/or among fibers.

It is believed that the rearrangement of the fibers can take one of two modes dependent on a number of factors such as, for example, fiber length. The free ends of longer fibers can be merely bent in the space defined by the deflection conduit while the opposite ends are restrained in the region of the ridges. Shorter fibers, on the other hand, can actually be transported from the region of the ridges into the deflection conduit (The fibers in the deflection conduits will also be rearranged relative to one another). Naturally, it is possible for both modes of rearrangement to occur simultaneously.

As noted, water removal occurs both during and after deflection; this water removal may result in a decrease in fiber mobility in the embryonic fibrous web. This decrease in fiber mobility may tend to fix and/or freeze the fibers in place after they have been deflected and rearranged. Of course, the drying of the web in a later step in the process of this invention serves to more firmly fix and/or freeze the fibers in position.

Any convenient means conventionally known in the papermaking art can be used to dry the intermediate fibrous web 54. Examples of such suitable drying process include subjecting the intermediate fibrous web 54 to conventional and/or flow-through dryers and/or Yankee dryers.

In one example of a drying process, the intermediate fibrous web 54 in association with the deflection member 34 passes around the deflection member return roll 36 and travels in the direction indicated by directional arrow 40. The intermediate fibrous web 54 may first pass through an optional predryer 56. This predryer 56 can be a conventional flow-through dryer (hot air dryer) well known to those skilled in the art. Optionally, the predryer 56 can be a so-called capillary dewatering apparatus. In such an apparatus, the intermediate fibrous web 54 passes over a sector of a cylinder having preferential-capillary-size pores through its cylindrical-shaped porous cover. Optionally, the predryer 56 can be a combination capillary dewatering apparatus and flow-through dryer. The quantity of water removed in the predryer 56 may be controlled so that a predried fibrous web 58 exiting the predryer 56 has a consistency of from about 30% to about 98%. The predried fibrous web 58, which may still be associated with deflection member 34, may pass around another deflection member return roll 36 and as it travels to an impression nip roll 38. As the predried fibrous web 58 passes through the nip formed between impression nip roll 38 and a surface of a Yankee dryer 60, the ridge pattern formed by the top surface 42 of deflection member 34 is impressed into the predried fibrous web 58 to form a linear element imprinted fibrous web 62. The imprinted fibrous web 62 can then be adhered to the surface of the Yankee dryer 60 where it can be dried to a consistency of at least about 95%.

The imprinted fibrous web 62 can then be foreshortened by creping the imprinted fibrous web 62 with a creping blade 64 to remove the imprinted fibrous web 62 from the surface of the Yankee dryer 60 resulting in the production of a creped fibrous structure 66 in accordance with the present invention. As used herein, foreshortening refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Foreshortening can be accomplished in any of several well-known ways. One common method of foreshortening is creping. The creped fibrous structure 96 may be subjected to post processing steps such as calendaring, tuft generating operations, and/or embossing and/or converting.

In addition to the Yankee fibrous structure making process/method, the fibrous structures of the present invention may be made using a Yankeeless fibrous structure making process/method. Such a process oftentimes utilizes transfer fabrics to permit rush transfer of the embryonic fibrous web prior to drying. The fibrous structures produced by such a Yankeeless fibrous structure making process oftentimes a substantially uniform density.

The molding member/deflection member of the present invention may be utilized to imprint linear elements into a fibrous structure during a through-air-drying operation.

However, such molding members/deflection members may also be utilized as forming members upon which a fiber slurry is deposited.

In one example, the linear elements of the present invention may be formed by a plurality of non-linear elements, such as embossments and/or protrusions and/or depressions formed by a molding member, that are arranged in a line having an overall length of greater than about 4.5 mm and/or greater than about 6 mm and/or greater than about 10 mm and/or greater than about 20 mm and/or greater than about 30 mm and/or greater than about 45 mm and/or greater than about 60 mm and/or greater than about 75 mm and/or greater than about 90 mm.

In addition to imprinting linear elements into fibrous structures during a fibrous structure making process/method, linear elements may be created in a fibrous structure during a converting operation of a fibrous structure. For example, linear elements may be imparted to a fibrous structure by embossing linear elements into a fibrous structure.

The linear element-containing fibrous structure may then be subjected to converting operations such as embossing, tuft-generating, calendaring, printing, and other fibrous structure processes.

In one example of the present invention, the fibrous structure is subjected to an embossing operation that imparts one or more line element embossments onto a surface of the fibrous structure. In addition to line element embossments, the dot element embossments may also be imparted to the surface.

The embossed fibrous structure of the present invention may be made by passing a fibrous structure, previously embossed or unembossed, through an embossing nip formed by two or more rolls, at least one of which is a patterned roll that imparts one or more embossments into the fibrous structure.

Figure 8:
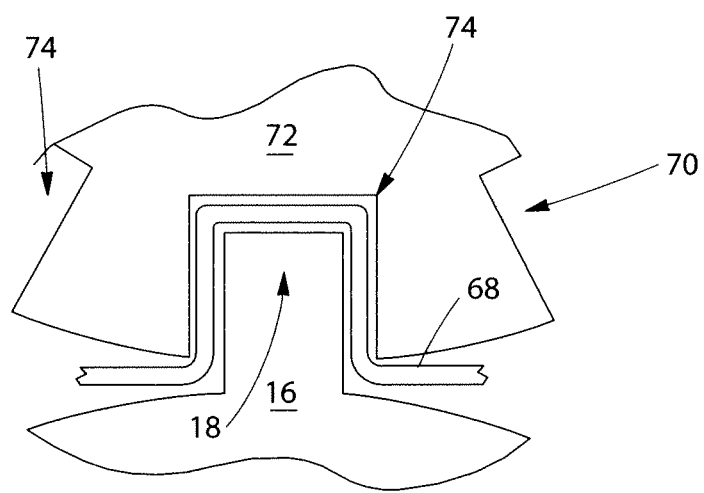
FIG. 8 is a partial, exploded schematic representation of an example of an embossing operation according to the present invention.

As shown in FIG. 8, the embossing operation may comprise passing a fibrous structure 68 through an embossing nip 70 formed by a first embossing roll 16 and a second embossing roll 72. The first embossing roll 16 comprises a male emboss pattern comprising one or more line element embossment protrusions 18. The second embossing roll 72 may comprise a female emboss pattern comprising one or more recesses 74, which complement the line element embossing protrusions 18 such that one or more of the line element embossment protrusions 18 of the first embossing roll 16 mesh with one or more recesses 74 of the second embossing roll 72.

The embossing operation may apply a nip pressure, via the embossing nip, to the fibrous structure of less than about 80 pounds per lineal inch (pli) and/or less than about 60 pli and/or less than about 40 pli and/or less than 20 pli and/or less than about 10 pli to about 1 pli and/or to about 2 pli and/or to about 5 pli during creation of the embossment in the fibrous structure. In one example, the nip pressure in the embossing nip 34 when a fibrous structure is present within the embossing nip 34 is from about 2 pli to about 10 pli and/or from about 5 pli to about 10 pli.

In one example, complementary pattern embossing elements (protrusions and recesses) are provided on a first patterned roll and a second patterned roll such that when the two rolls are rotated together in synchronization, an embossing nip is formed which is capable of imparting an embossment to a fibrous structure passing through the embossing nip.

The embossing operation of the process of the present invention and embossments made in the fibrous structure of the present invention may be phase registered with other features imparted in the fibrous structure.

Non-Limiting Example

A fibrous structure in accordance with the present invention is prepared using a fibrous structure making machine having a layered headbox having a top chamber, a center chamber, and a bottom chamber. A eucalyptus fiber slurry is pumped through the top headbox chamber, a eucalyptus fiber slurry is pumped through the bottom headbox chamber (i.e. the chamber feeding directly onto the forming wire) and, finally, an NSK fiber slurry is pumped through the center headbox chamber and delivered in superposed relation onto the Fourdrinier wire to form thereon a three-layer embryonic web, of which about 33% of the top side is made up of the eucalyptus blended fibers, 33% is made of the eucalyptus fibers on the bottom side and 33% is made up of the NSK fibers in the center. Dewatering occurs through the Fourdrinier wire and is assisted by a deflector and vacuum boxes. The Fourdrinier wire is of a 5-shed, satin weave configuration having 87 machine-direction and 76 cross-machine-direction monofilaments per inch, respectively. The speed of the Fourdrinier wire is about 750 fpm (feet per minute).

The embryonic wet web is transferred from the Fourdrinier wire, at a fiber consistency of about 15% at the point of transfer, to a patterned drying fabric. The speed of the patterned drying fabric is the same as the speed of the Fourdrinier wire. The drying fabric is designed to yield a pattern of substantially machine direction oriented linear channels having a continuous network of high density (knuckle) areas. This drying fabric is formed by casting an impervious resin surface onto a fiber mesh supporting fabric. The supporting fabric is a 45×52 filament, dual layer mesh. The thickness of the resin cast is about 11 mils above the supporting fabric.

Further de-watering is accomplished by vacuum assisted drainage until the web has a fiber consistency of about 20% to 30%.

While remaining in contact with the patterned drying fabric, the web is pre-dried by air blow-through pre-dryers to a fiber consistency of about 65% by weight.

After the pre-dryers, the semi-dry web is transferred to the Yankee dryer and adhered to the surface of the Yankee dryer with a sprayed creping adhesive. The creping adhesive is an aqueous dispersion with the actives consisting of about 22% polyvinyl alcohol, about 11% CREPETROL A3025, and about 67% CREPETROL R6390. CREPETROL A3025 and CREPETROL R6390 are commercially available from Hercules Incorporated of Wilmington, Del. The creping adhesive is delivered to the Yankee surface at a rate of about 0.15% adhesive solids based on the dry weight of the web. The fiber consistency is increased to about 97% before the web is dry creped from the Yankee with a doctor blade.

The doctor blade has a bevel angle of about 25 degrees and is positioned with respect to the Yankee dryer to provide an impact angle of about 81 degrees. The Yankee dryer is operated at a temperature of about 350° F. (177° C.) and a speed of about 750 fpm. The fibrous structure is wound in a roll using a surface driven reel drum having a surface speed of about 656 feet per minute. The fibrous structure is subjected to an embossing operation that imparts one or more line element embossments to a surface of the fibrous structure. The fibrous structure may be subsequently converted into a two-ply sanitary tissue product having a basis weight of about 39 g/m$^2$. For each ply, the outer layer having the eucalyptus fiber furnish is oriented toward the outside in order to form the consumer facing surfaces of the two-ply sanitary tissue product.

The sanitary tissue product is soft, flexible and absorbent.

Figure 9:
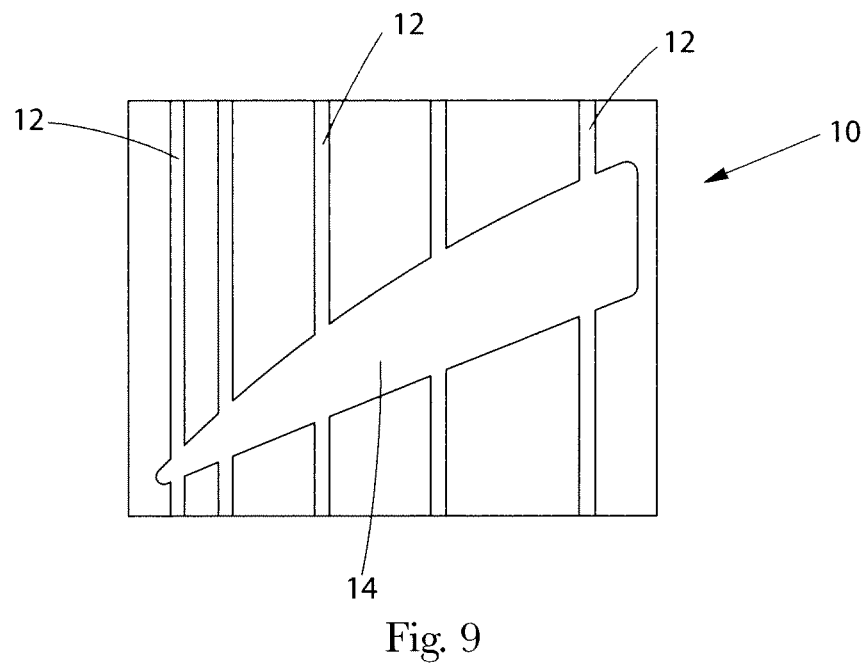
FIG. 9 is a top plan view of an example of an embossed fibrous structure according to the present invention.

In one example as shown in FIG. 9, an embossed fibrous structure making method according to the present invention may be used to make an embossed fibrous structure 10 comprising linear elements 12 that are spaced apart from each other at increasing intervals and a line element embossment 14 that exhibits a line element width that increases along its length.

Figure 10:
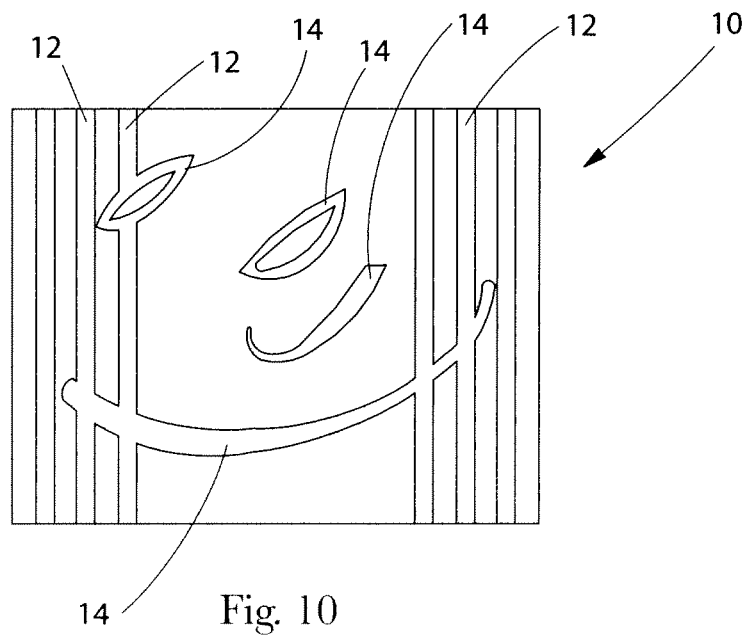
FIG. 10 is a top plan view of another example of an embossed fibrous structure according to the present invention.

In another example as shown in FIG. 10, an embossed fibrous structure making method according to the present invention may be used to make an embossed fibrous structure 10 comprising linear elements 12 that are non-uniformly positioned on the embossed fibrous structure 10 such that one or more line element embossments 14 do not overlap any part of the linear elements 12. The embossed fibrous structure 10 may also include one or more line element embossments 14 that do overlap one or more linear elements 12.

Figure 11:
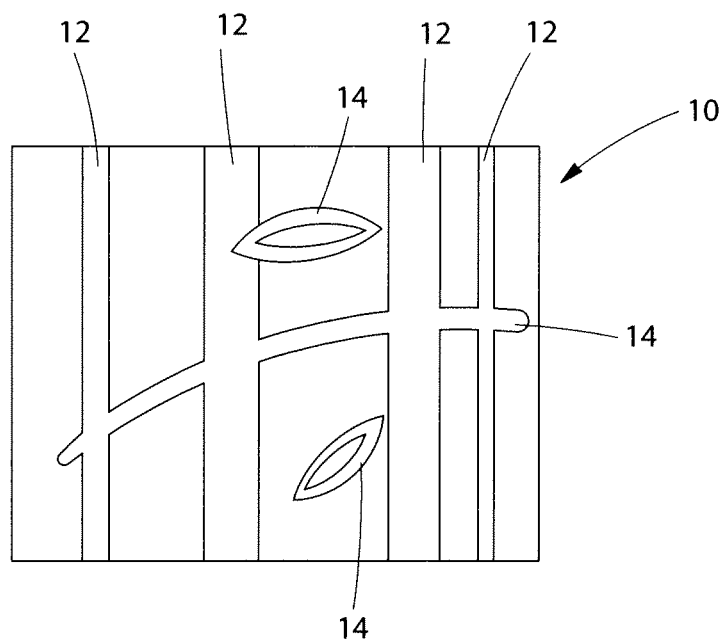
FIG. 11 is a top plan view of another example of an embossed fibrous structure according to the present invention.

In yet another example as shown in FIG. 11, an embossed fibrous structure making method according to the present invention may be used to make an embossed fibrous structure 10 comprising linear elements 12 that vary in linear element width and one or more line element embossments 14 that overlap one or more linear elements 12 and/or that do not overlap any linear elements 12.

Test Methods

Unless otherwise specified, all tests described herein including those described under the Definitions section and the following test methods are conducted on samples that have been conditioned in a conditioned room at a temperature of 73° F.±4° F. (about 23° C.±2.2° C.) and relative humidity of 50%±10% for 2 hours prior to the test. All plastic and paper board packaging materials must be carefully removed from the paper samples prior to testing. Discard any damaged product. All tests are conducted in such conditioned room.

Basis Weight Test Method

Basis weight of a fibrous structure sample is measured by selecting twelve (12) usable units (also referred to as sheets) of the fibrous structure and making two stacks of six (6) usable units each. Perforation must be aligned on the same side when stacking the usable units. A precision cutter is used to cut each stack into exactly 8.89 cm×8.89 cm (3.5 in.×3.5 in.) squares. The two stacks of cut squares are combined to make a basis weight pad of twelve (12) squares thick. The basis weight pad is then weighed on a top loading balance with a minimum resolution of 0.01 g. The top loading balance must be protected from air drafts and other disturbances using a draft shield. Weights are recorded when the readings on the top loading balance become constant. The Basis Weight is calculated as follows:

$$\text{Basis Weight (lbs/3000 ft}^2\text{)} = \frac{\text{Weight of basis weight pad (g)} \times 3000 \text{ ft}^2}{453.6 \text{ g/lbs} \times 12 \text{ (usable units)} \times [12.25 \text{ in}^2 \text{ (Area of basis weight pad)}/144 \text{ in}^2]}$$

$$\text{Basis Weight (g/m}^2\text{)} = \frac{\text{Weight of basis weight pad (g)} \times 10{,}000 \text{ cm}^2/\text{m}^2}{79.0321 \text{ cm}^2 \text{ (Area of basis weight pad)} \times 12 \text{ (usable units)}}$$

Dimensions of Linear Element/Linear Element Forming Component Test Method

The length of a linear element in a fibrous structure and/or the length of a linear element forming component in a molding member is measured by image scaling of a light microscopy image of a sample of fibrous structure.

A light microscopy image of a sample to be analyzed such as a fibrous structure or a molding member is obtained with a representative scale associated with the image. The images is saved as a *.tiff file on a computer. Once the image is saved, SmartSketch, version 05.00.35.14 software made by Intergraph Corporation of Huntsville, Ala., is opened. Once the software is opened and running on the computer, the user clicks on "New" from the "File" drop-down panel. Next, "Normal" is selected. "Properties" is then selected from the "File" drop-down panel. Under the "Units" tab, "mm" (millimeters) is chosen as the unit of measure and "0.123" as the precision of the measurement. Next, "Dimension" is selected from the "Format" drop-down panel. Click the "Units" tab and ensure that the "Units" and "Unit Labels" read "mm" and that the "Round-Off" is set at "0.123." Next, the "rectangle" shape from the selection panel is selected and dragged into the sheet area. Highlight the top horizontal line of the rectangle and set the length to the corresponding scale indicated light microscopy image. This will set the width of the rectangle to the scale required for sizing the light microscopy image. Now that the rectangle has been sized for the light microscopy image, highlight the top horizontal line and delete the line. Highlight the left and right vertical lines and the bottom horizontal line and select "Group". This keeps each of the line segments grouped at the width dimension ("mm") selected earlier. With the group highlighted, drop the "line width" panel down and type in "0.01 mm." The scaled line segment group is now ready to use for scaling the light microscopy image can be confirmed by right-clicking on the "dimension between", then clicking on the two vertical line segments.

To insert the light microscopy image, click on the "Image" from the "insert" drop-down panel. The image type is preferably a *.tiff format. Select the light microscopy image to be inserted from the saved file, then click on the sheet to place the light microscopy image. Click on the right bottom corner of the image and drag the corner diagonally from bottom-right to top-left. This will ensure that the image's aspect ratio will not be modified. Using the "Zoom In" feature, click on the image until the light microscopy image scale and the scale group line segments can be seen. Move the scale group segment over the light microscopy image scale. Increase or decrease the light microscopy image size as needed until the light microscopy image scale and the scale group line segments are equal. Once the light microscopy image scale and the scale group line segments are visible, the object(s) depicted in the light microscopy image can be measured using "line symbols" (located in the selection panel on the right) positioned in a parallel fashion and the "Distance Between" feature. For length and width measurements, a top view of a fibrous structure and/or molding member is used as the light microscopy image. For a height measurement, a side or cross sectional view of the fibrous structure and/or molding member is used as the light microscopy image.

Embossment Height Test Method

The GFM Primos Optical Profiler system measures the surface height of a sample using the digital micro-mirror pattern projection technique. The result of the analysis is a map of surface height (z) vs. xy displacement. The system has a field of view of 27×22 mm with a resolution of 21 microns. The height resolution should be set to between 0.10 and 1.00 micron. The height range is 64,000 times the resolution.

To measure a fibrous structure sample do the following:
1. Turn on the cold light source. The settings on the cold light source should be 4 and C, which should give a reading of 3000K on the display;
2. Turn on the computer, monitor and printer and open the ODSCAD 4.0 Primos Software.
3. Select "Start Measurement" icon from the Primos taskbar and then click the "Live Pic" button.

4. Place a 30 mm by 30 mm sample of fibrous structure product conditioned at a temperature of 73° F.±2° F. (about 23° C.±1° C.) and a relative humidity of 50%±2% under the projection head and adjust the distance for best focus.
5. Click the "Pattern" button repeatedly to project one of several focusing patterns to aid in achieving the best focus (the software cross hair should align with the projected cross hair when optimal focus is achieved). Position the projection head to be normal to the sample surface.
6. Adjust image brightness by changing the aperture on the lens through the hole in the side of the projector head and/or altering the camera "gain" setting on the screen. Do not set the gain higher than 7 to control the amount of electronic noise. When the illumination is optimum, the red circle at bottom of the screen labeled "I.O." will turn green.
7. Select Technical Surface/Rough measurement type.
8. Click on the "Measure" button. This will freeze on the live image on the screen and, simultaneously, the image will be captured and digitized. It is important to keep the sample still during this time to avoid blurring of the captured image. The image will be captured in approximately 20 seconds.
9. If the image is satisfactory, save the image to a computer file with ".omc" extension. This will also save the camera image file ".kam".
10. To move the data into the analysis portion of the software, click on the clipboard/man icon.
11. Now, click on the icon "Draw Cutting Lines". Make sure active line is set to line 1. Move the cross hairs to the lowest point on the left side of the computer screen image and click the mouse. Then move the cross hairs to the lowest point on the right side of the computer screen image on the current line and click the mouse. Now click on "Align" by marked points icon. Now click the mouse on the lowest point on this line, and then click the mouse on the highest point on this line. Click the "Vertical" distance icon. Record the distance measurement. Now increase the active line to the next line, and repeat the previous steps, do this until all lines have been measured (six (6) lines in total. Take the average of all recorded numbers, and if the units is not micrometers, convert it to micrometers (μm). This number is the embossment height. Repeat this procedure for another image in the fibrous structure product sample and take the average of the embossment heights.

Flexural Rigidity Test Method

This test is performed on 1 inch×6 inch (2.54 cm×15.24 cm) strips of a fibrous structure sample. A Cantilever Bending Tester such as described in ASTM Standard D 1388 (Model 5010, Instrument Marketing Services, Fairfield, N.J.) is used and operated at a ramp angle of 41.5±0.5° and a sample slide speed of 0.5±0.2 in/second (1.3±0.5 cm/second). A minimum of n=16 tests are performed on each sample from n=8 sample strips.

No fibrous structure sample which is creased, bent, folded, perforated, or in any other way weakened should ever be tested using this test. A non-creased, non-bent, non-folded, non-perforated, and non-weakened in any other way fibrous structure sample should be used for testing under this test.

From one fibrous structure sample of about 4 inch×6 inch (10.16 cm×15.24 cm), carefully cut using a 1 inch (2.54 cm) JDC Cutter (available from Thwing-Albert Instrument Company, Philadelphia, Pa.) four (4) 1 inch (2.54 cm) wide by 6 inch (15.24 cm) long strips of the fibrous structure in the MD direction. From a second fibrous structure sample from the same sample set, carefully cut four (4) 1 inch (2.54 cm) wide by 6 inch (15.24 cm) long strips of the fibrous structure in the CD direction. It is important that the cut be exactly perpendicular to the long dimension of the strip. In cutting non-laminated two-ply fibrous structure strips, the strips should be cut individually. The strip should also be free of wrinkles or excessive mechanical manipulation which can impact flexibility. Mark the direction very lightly on one end of the strip, keeping the same surface of the sample up for all strips. Later, the strips will be turned over for testing, thus it is important that one surface of the strip be clearly identified, however, it makes no difference which surface of the sample is designated as the upper surface.

Using other portions of the fibrous structure (not the cut strips), determine the basis weight of the fibrous structure sample in lbs/3000 ft$^2$ and the caliper of the fibrous structure in mils (thousandths of an inch) using the standard procedures disclosed herein. Place the Cantilever Bending Tester level on a bench or table that is relatively free of vibration, excessive heat and most importantly air drafts. Adjust the platform of the Tester to horizontal as indicated by the leveling bubble and verify that the ramp angle is at 41.5±0.5°. Remove the sample slide bar from the top of the platform of the Tester. Place one of the strips on the horizontal platform using care to align the strip parallel with the movable sample slide. Align the strip exactly even with the vertical edge of the Tester wherein the angular ramp is attached or where the zero mark line is scribed on the Tester. Carefully place the sample slide bar back on top of the sample strip in the Tester. The sample slide bar must be carefully placed so that the strip is not wrinkled or moved from its initial position.

Move the strip and movable sample slide at a rate of approximately 0.5±0.2 in/second (1.3±0.5 cm/second) toward the end of the Tester to which the angular ramp is attached. This can be accomplished with either a manual or automatic Tester. Ensure that no slippage between the strip and movable sample slide occurs. As the sample slide bar and strip project over the edge of the Tester, the strip will begin to bend, or drape downward. Stop moving the sample slide bar the instant the leading edge of the strip falls level with the ramp edge. Read and record the overhang length from the linear scale to the nearest 0.5 mm. Record the distance the sample slide bar has moved in cm as overhang length. This test sequence is performed a total of eight (8) times for each fibrous structure in each direction (MD and CD). The first four strips are tested with the upper surface as the fibrous structure was cut facing up. The last four strips are inverted so that the upper surface as the fibrous structure was cut is facing down as the strip is placed on the horizontal platform of the Tester.

The average overhang length is determined by averaging the sixteen (16) readings obtained on a fibrous structure.

$$\text{Overhang Length } MD = \frac{\text{Sum of 8 } MD \text{ readings}}{8}$$

$$\text{Overhang Length } CD = \frac{\text{Sum of 8 } CD \text{ readings}}{8}$$

$$\text{Overhang Length Total} = \frac{\text{Sum of all 16 readings}}{16}$$

$$\text{Bend Length } MD = \frac{\text{Overhang Length } MD}{2}$$

$$\text{Bend Length } CD = \frac{\text{Overhang Length } CD}{2}$$

$$\text{Bend Length Total} = \frac{\text{Overhang Length Total}}{2}$$

$$\text{Flexural Rigidity} = 0.1629 \times W \times C^3$$

wherein W is the basis weight of the fibrous structure in lbs/3000 ft$^2$; C is the bending length (MD or CD or Total) in cm; and the constant 0.1629 is used to convert the basis weight from English to metric units. The results are expressed in mg-cm, but are referred to only a cm.

Roughness and Radius of Curvature Test Method

Roughness and radius of curvature measurements were made using two GF Messtechnik (Teltow/Berlin, Germany) Mikrocad optical surface profilers. Instrument 1 and 2 are identical in operation except the field of view and resolution. Instrument 1 had a field of view of 4.1×3.2 mm with an XY resolution of 3.1 microns while Instrument 2 had a field of view of 27.3×21.6 mm with an XY resolution of 21 microns. Three areas of each sample were analyzed by each instrument.

Ridge roughness was measured on two scales ~3.9 mm and ~26 mm. The raw data files were loaded into the ODSCAD 4.14-1.8 software (GFM) and the data was aligned (sample tilt removed) and invalid points removed using the standard ODSCAD functions. The line profile tool was used to draw a profile line along the centerline of 5 different ridges in sequence and line roughness (Ra, average roughness) calculated for each using the DIN 4768 roughness standard method built into the ODSCAD roughness module.

Radius of Curvature was determined using the data only from the 4×3 mm system since this provided sufficient resolution for the measurement. The raw data files were loaded into the ODSCAD software and exported into the FD3 v1 format. The FD3 files were then loaded into SPIP 4.8.0 (Image Metrology A/S, Hørsholm, Denmark). The fat slab line profile averaging tool was used to average the cross section of the ridges, along the centerline of the ridge, giving the average ridge profile over a length of about 3 mm. The Radius of Curvature Tool was then used to measure the radius of curvature of the transition from the ridge wall to the top surface of the ridge on both sides of the ridge. This was repeated for two ridges per sample. In addition, the radius of curvature was measured similarly for the concave curve in the top surface of the ridge.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A through-air-dried fibrous structure comprising a plurality of linear elements wherein at least one of the linear elements is substantially continuous and one or more line element embossments wherein at least one of the line element embossments overlaps one or more of the linear elements, the line element embossments having a width W1 and the linear elements having a width W2, wherein the ratio of W2 to W1 is 1:4 or less and wherein W1 is greater than 1.0 mm, and wherein at least one of the line element embossments is a partially enclosed line element embossment.

2. The fibrous structure according to claim 1 wherein the linear elements are present in at least one region and at least one of the line element embossments is present in a different region.

3. The fibrous structure according to claim 1 wherein two or more of the linear elements exhibit different widths.

4. The fibrous structure according to claim 1 wherein the linear elements are uniformly spaced apart from each other.

5. The fibrous structure according to claim 1 wherein the linear elements are non-uniformly spaced apart from each other.

6. The fibrous structure according to claim 1 wherein at least one of the line element embossments exhibits a uniform line element width.

7. The fibrous structure according to claim 1 wherein at least one of the line element embossments exhibits a non-uniform line element width.

8. The fibrous structure according to claim 1 wherein the plurality of the linear elements are oriented in substantially the machine direction on the fibrous structure.

9. The fibrous structure according to claim 1 wherein the plurality of the linear elements are oriented in substantially the cross-machine direction on the fibrous structure.

10. The fibrous structure according to claim 1 wherein at least one of the linear elements is imparted to the fibrous structure during the fibrous structure making process.

11. The fibrous structure according to claim 1 wherein at least one of the linear elements is imparted to the fibrous structure by an embossing process.

12. The fibrous structure according to claim 1 wherein at least one of the line element embossments is an enclosed line element embossment.

13. The fibrous structure according to claim 1 wherein the plurality of linear elements are spaced apart from one another at a distance of at least 0.30 mm.

14. The fibrous structure according to claim 1 wherein the plurality of linear elements are spaced apart from one another at a distance of less than 3.0 mm.

15. The fibrous structure according to claim 1 wherein at least one of the line element embossments exhibits a line element width of at least 0.30 mm.

16. A single- or multi-ply sanitary tissue product comprising a fibrous structure according to claim 1.

* * * * *